(12) United States Patent
Rosen

(10) Patent No.: US 7,840,180 B2
(45) Date of Patent: Nov. 23, 2010

(54) MOLNIYA ORBIT SATELLITE SYSTEMS, APPARATUS, AND METHODS

(75) Inventor: Harold A. Rosen, Santa Monica, CA (US)

(73) Assignee: The Boeing Company, Chicago, IL (US)

( * ) Notice: Subject to any disclaimer, the term of this patent is extended or adjusted under 35 U.S.C. 154(b) by 812 days.

(21) Appl. No.: 11/615,774

(22) Filed: Dec. 22, 2006

(65) Prior Publication Data

US 2008/0155610 A1  Jun. 26, 2008

(51) Int. Cl.
 *H04B 7/185* (2006.01)

(52) U.S. Cl. .............. 455/12.1; 455/3.02; 455/3.06; 455/25; 455/427; 725/68; 725/64

(58) Field of Classification Search ........... 455/12.1, 455/13.2, 63.4, 25, 431, 427, 3.06, 3.02, 455/3.03, 73, 517, 345; 725/68, 69, 71, 100, 725/64, 63, 78, 80; 370/316

See application file for complete search history.

(56) References Cited

U.S. PATENT DOCUMENTS

| | | | |
|---|---|---|---|
| 4,854,527 A | 8/1989 | Draim | |
| 4,911,385 A | 3/1990 | Agrawal et al. | |
| 5,199,672 A | 4/1993 | King et al. | |
| 5,326,054 A | 7/1994 | Turner | |
| 5,553,816 A | 9/1996 | Perrotta | |
| 5,582,367 A | 12/1996 | Castiel et al. | |
| 5,602,838 A | 2/1997 | Kartalopoulos | |
| 5,669,585 A | 9/1997 | Castiel et al. | |
| 5,681,011 A | 10/1997 | Frazier | |
| 5,788,187 A | 8/1998 | Castiel et al. | |
| 5,822,680 A | 10/1998 | Stuart et al. | |
| 5,871,181 A | 2/1999 | Mass | |
| 5,896,558 A | 4/1999 | Wiedeman | |
| 5,931,417 A | 8/1999 | Castiel | |
| 6,019,318 A | 2/2000 | Cellier et al. | |
| 6,102,335 A | 8/2000 | Castiel et al. | |
| 6,122,596 A | 9/2000 | Castiel | |
| 6,138,951 A | 10/2000 | Budris et al. | |
| 6,160,994 A | 12/2000 | Wiedeman | |
| 6,198,907 B1 * | 3/2001 | Torkington et al. | ........ 455/12.1 |
| 6,223,019 B1 | 4/2001 | Briskman et al. | |
| 6,325,332 B1 | 12/2001 | Cellier et al. | |
| 6,327,523 B2 | 12/2001 | Cellier | |
| 6,389,336 B2 | 5/2002 | Cellier | |

(Continued)

*Primary Examiner*—Tan Trinh
(74) *Attorney, Agent, or Firm*—Yee & Associates, P.C.; Kevin G. Fields

(57) ABSTRACT

A system includes a satellite fleet (102, FIG. 1), in which each satellite receives uplink signals from an uplink hub (104), and transmits downlink signals in at least one directed beam (112). In an embodiment, downlink signals include television content, which is transmitted within a frequency range between about 3.7 and 4.2 Gigahertz. The satellites follow Molniya orbits (1001-1006, FIG. 10), orbit nodes are equally separated, and the satellite phasing is maintained to provide continuous communication within a coverage area. A system also includes user equipment systems (1300, FIG. 13), which include highly-directional, non-tracking antennas (1302) adapted to receive the downlink signals. In an embodiment, a method includes the satellites maintaining orbit phasings, with respect to other satellites, so that the satellite enters an active orbit segment and initiates transmission of downlink signals as a second satellite exits an active orbit segment and ceases transmission of the downlink signals.

18 Claims, 9 Drawing Sheets

U.S. PATENT DOCUMENTS

| | | |
|---|---|---|
| 6,457,678 B1 | 10/2002 | Draim |
| 6,511,020 B2 | 1/2003 | Higgins |
| 6,564,053 B1 | 5/2003 | Briskman et al. |
| 6,597,989 B2 | 7/2003 | Castiel |
| 6,695,259 B1 | 2/2004 | Maeda et al. |
| 6,701,126 B1 | 3/2004 | Draim |
| 6,714,521 B2 | 3/2004 | Draim |
| 6,726,152 B2 | 4/2004 | Higgins |
| 6,851,651 B2 | 2/2005 | Goodzeit |
| 6,866,231 B2 | 3/2005 | Higgins |
| 2002/0136191 A1* | 9/2002 | Draim et al. ............... 370/344 |
| 2003/0189136 A1 | 10/2003 | Maeda et al. |
| 2003/0228867 A1* | 12/2003 | Castiel ...................... 455/427 |
| 2004/0211864 A1 | 10/2004 | Less et al. |
| 2005/0068915 A1* | 3/2005 | Atad et al. .................. 370/316 |
| 2005/0098686 A1* | 5/2005 | Goodzeit ................ 244/158 R |
| 2005/0178918 A1 | 8/2005 | Maeda et al. |
| 2006/0016934 A1* | 1/2006 | Sharer ..................... 244/158.4 |
| 2006/0105708 A1* | 5/2006 | Maeda et al. .............. 455/12.1 |
| 2006/0271966 A1* | 11/2006 | Staal et al. ................... 725/68 |
| 2007/0023579 A1 | 2/2007 | Wang et al. |
| 2008/0237399 A1 | 10/2008 | Caplin et al. |
| 2008/0307466 A1* | 12/2008 | Wang .......................... 725/68 |
| 2009/0224105 A1 | 9/2009 | Caplin et al. |

\* cited by examiner

US 7,840,180 B2

MOLNIYA ORBIT SATELLITE SYSTEMS, APPARATUS, AND METHODS

TECHNICAL FIELD

Embodiments described herein generally relate to direct broadcast satellite systems, apparatus, and methods, and more particularly relate to direct broadcast satellite systems, which include non-geostationary orbit satellites in highly elliptical orbits.

BACKGROUND

Digital television services have been provided within certain geographical areas using direct broadcast satellite (DBS) systems, which also may be referred to as direct-to-home (DTH) systems. A DBS system may include at least one geostationary orbit (GSO) satellite or non-GSO (NGSO) satellite. A DBS satellite receives television content over uplinks from one or more terrestrially-based hubs, and broadcasts the content on downlinks toward populations of user equipment systems.

A first type of DBS system includes at least one GSO satellite. A GSO satellite has a geocentric orbit directly above the equator, and this orbit has the same orbital period as the sidereal rotation period of the Earth. Accordingly, a GSO satellite appears to be substantially stationary with respect to a point on the surface of the Earth, and a GSO satellite may provide services within a fixed geographical area within view of the satellite.

In the United States and Europe, a GSO DBS satellite may broadcast signals within various segments of the $K_u$ band (e.g., from 12.2 to 12.7 Gigahertz (GHz) in the U.S. and from 10.7 to 12.75 GHz in Europe). A GSO DBS satellite transponder may transmit signals at relatively high power (e.g., 100-240 Watts) per channel. The high transmission power, coupled with the geostationary orbit paths of a GSO DBS satellite, allow for the use of stationary (e.g., non-tracking) receiver antennas as small as 45 centimeters (cm) to be used in conjunction with user equipment systems. These relatively low-cost receiver antennas make GSO DBS services affordable to tens of millions of current subscribers.

However, DBS systems that employ GSO satellites suffer from several disadvantages. For example, a limited number of orbit slots in the equatorial belt are designated to DBS services, and only a handful of these orbital slots are located at the most desirable longitudes (e.g., over regions of the world that include large populations of potential users). Accordingly, a first disadvantage to GSO DBS satellite systems is that only a limited number of providers may service these areas. In addition, the equatorial orbit of the GSO satellites makes it difficult to provide adequate service in higher latitudes, because signal blocking from obstacles increases for a receiver antenna that is pointed close to the horizon. Further, GSO DBS satellite systems generally transmit signals within $K_u$ band and higher frequencies, because of the dense orbital spacing at C band would require user antennas of an impractical size. However, signals transmitted within $K_u$ band and higher frequencies may be significantly affected by rain attenuation. Thus, another disadvantage to GSO DBS satellite systems is that acceptable service may not be consistently achievable in areas that experience significant amounts of rain or foul weather.

An NGSO satellite has an orbit, which may have both inclination and eccentricity. Inclination causes a satellite's orbit path to pass above and below the equator, and eccentricity causes the satellite's orbital speed to slow in the vicinity of apogee. Accordingly, a satellite having an NGSO orbit path may be more easily visible users located at fairly high northern or southern latitudes. NGSO satellites, however, have apparent motion when viewed from the ground.

Because of this, NGSO systems suffer from several disadvantages. Primarily, due to the apparent motion of the NGSO satellites with respect to the Earth's surface, they are often used in systems having substantially omni-directional user antennas and receivers. Omni-directional receivers, in practice, are only used at long wavelengths, because the effective capture area is proportional to the square of the wavelength. The limited bandwidths available at long wavelengths (e.g., frequencies within the L band and S band) limit communications to narrow band signals, which are inadequate for multi-channel television transmissions. Alternatively, directional receiver antennas could be used at shorter wavelengths. However, directional receiver antennas would need to track the satellite motion. For shorter wavelength systems, the cost of the tracking antennas precludes their use for typical direct-to-home television service. Accordingly, NGSO systems have not been used for direct-to-home television service.

Many potential users within certain geographical areas have not had access to reliable, affordable, and/or practical satellite-based, digital television services. It is desirable to provide systems, apparatus, and methods to provide reliable, affordable, and practical satellite-based digital television services to geographical areas that have had limited access to such services in the past. Other desirable features and characteristics of embodiments of the inventive subject matter will become apparent from the subsequent detailed description and the appended claims, taken in conjunction with the accompanying drawings and the foregoing technical field and background.

BRIEF DESCRIPTION OF THE DRAWINGS

Various embodiments will hereinafter be described in conjunction with the following drawing figures, wherein like numerals denote like elements.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Embodiments of the inventive subject matter include a direct broadcast satellite (DBS) system that includes a plurality of satellites, which transmit (e.g., broadcast) television signals toward a target geographical area. In an embodiment, each satellite transmits television signals within the C-band (e.g., within a frequency range between 3.7 and 4.2 GHz). The plurality of satellites are in Molniya orbits, in an embodiment, whose nodes are substantially equally separated around the Earth. The satellites are phased in their orbit paths so that they track along a common ground track. In addition, the satellites are phased in their orbits so that a first satellite enters an active orbit segment and initiates transmission of the downlink signals as a second satellite exits an active orbit segment and ceases transmission of the downlink signals. As used herein, the term "active orbit segment" means an orbit segment that is centered about an apogee and has a duration of a sidereal day divided by a total number of satellites in the plurality of satellites. A target geographical area on the Earth's surface may be located anywhere within view of an apogee, in an embodiment. More favorable user locations correspond to higher elevation angles, in the system, and therefore the more favorable user locations are considered to be closer to the ground track latitude and longitude associated with the orbit apogee.

In various embodiments, the apogee is far enough from the equator, so that the system's satellites may transmit signals within the C band (e.g., 3.7 to 4.2 GHz) without interfering with or being interfered by GSO DBS satellites. C band signals are less affected by rain attenuation than equal signals transmitted within the Ku band. Accordingly, C band NGSO DBS satellites may transmit signals using substantially less transmission power than GSO DBS satellites transmitting within the $K_u$ band.

Embodiments include satellites that are configured to handle wide band signals suitable for multi-channel television. Directional user antennas of adequate area can be provided with uninterrupted signals by employing a fleet of satellites in phased Molniya orbits, and by taking advantage of a long dwell time of the orbit in the vicinity of apogee. The satellite fleet phasing provides at all times an active satellite within the beamwidth of non-tracking user antennas, which may be pointed during installation in a desired direction.

Figure 1:
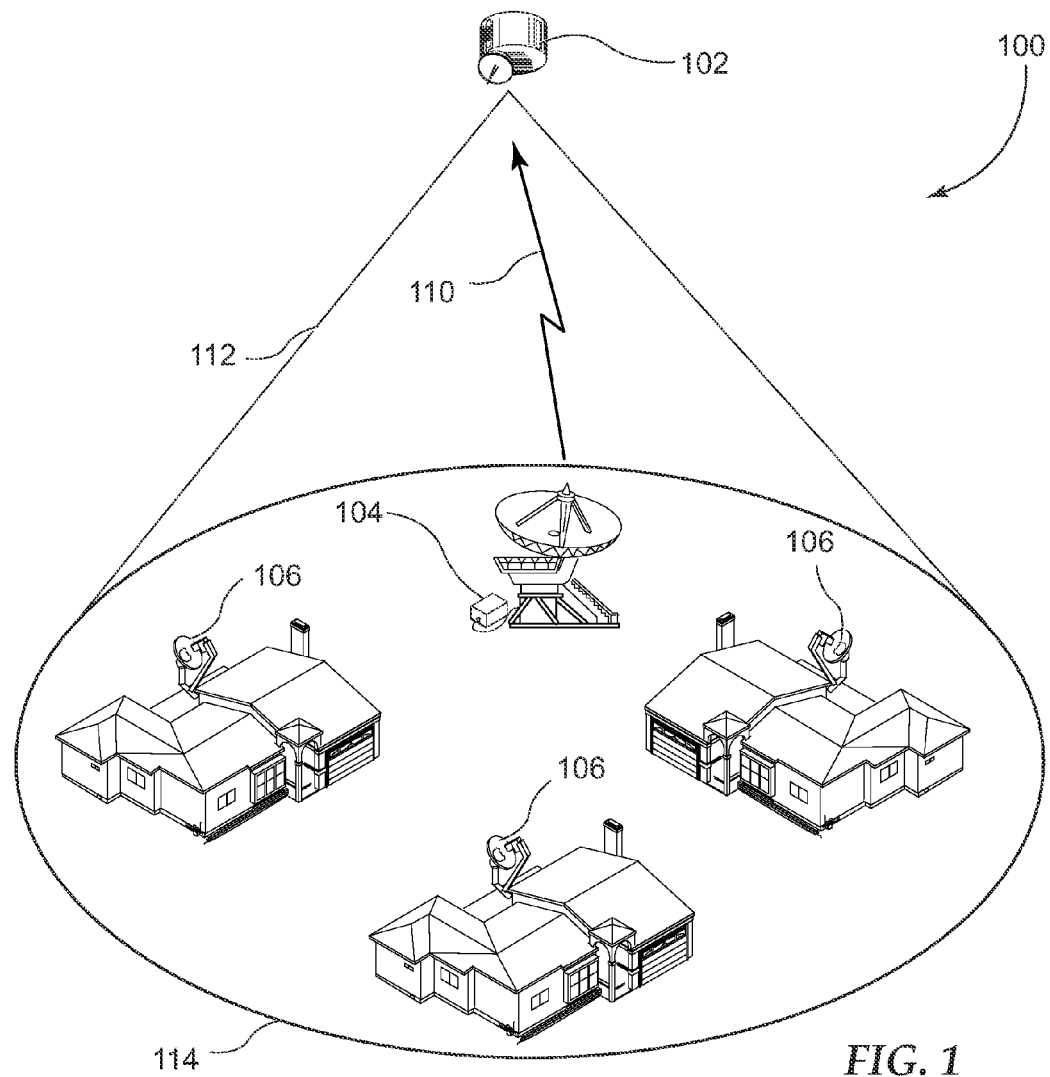
FIG. 1 illustrates a portion of a direct broadcast satellite system, in accordance with an example embodiment of the inventive subject matter.

FIG. 1 illustrates a portion of a DBS system 100, in accordance with an example embodiment of the inventive subject matter. DBS system 100 includes a plurality of satellites, such as satellite 102, within the user beams, at least one uplink hub 104, and a plurality of user equipment (UE) systems, where each UE system includes a UE antenna 106. Although FIG. 1 shows a single satellite 102, DBS system 100 may include a plurality of satellites. In an embodiment, DBS system 100 includes six satellites, although a DBS system may include more or fewer satellites in other embodiments. Also, although one uplink hub 104 is illustrated, a DBS system may include more than one uplink hub, in other embodiments. Further, although three UE antennas 106 are illustrated, a DBS system may include a multitude (e.g., millions) of UE antennas 106 and UE systems.

Uplink hub 104 may include a control facility and one or more uplink antennas, in an embodiment. Uplink hub 104 is adapted to transmit uplink signals 110 toward satellite 102. In an embodiment in which DBS system includes a plurality of satellites, uplink hub 104 may transmit uplink signals 110 toward each satellite when the satellite is in an active mode (e.g., the satellite is receiving uplink signals and transmitting downlink signals). Uplink signals may include, for example, satellite control information and/or content, among other things. In an embodiment, content may include uplink television signals, which may include multiple audio and video content streams.

Satellite 102 is adapted to receive uplink signals 110 from uplink hub 104. Satellite 102 further is adapted to transmit downlink signals toward the surface of the Earth. Uplink and downlink signals may include content, such as television signals, for example. In an embodiment, satellite 102 transmits downlink signals in at least one directed beam 112. Although FIG. 1 illustrates a single beam 112, satellite 102 may transmit downlink signals in multiple directed beams, which may or may not overlap each other. Signals transmitted within a directed beam 112 may intersect the surface of the Earth within a region 114. A region 114 may define a geographical area within which the signal strength and/or signal-to-noise ratio (SNR) of the transmitted downlink signals is considered to be above a threshold. A region 114 may be substantially circular, elliptical, or otherwise shaped, in various embodiments.

In various embodiments, satellite 102 may multi-cast and/or broadcast downlink signals toward a population of UE systems that are located proximate to a surface of the Earth. In a particular embodiment, satellite 102 is adapted to receive uplink television signals and to broadcast downlink television signals, which UE antennas 106 and systems are adapted to receive. Satellite 102 transmits downlink television signals within a frequency range between 3.7 and 4.2 Gigahertz (GHz), or within the C-band, in an embodiment. In other embodiments, satellite 102 may transmit downlink signals within other bands and/or within other frequency ranges.

As will be described in more detail in conjunction with FIGS. 2-6, a DBS system includes a plurality of satellites (e.g., a "satellite fleet"), which follow highly elliptical orbit (HEO) paths (e.g., Molniya orbit paths). In a particular embodiment, a satellite fleet includes six satellites, although a fleet may include more or fewer satellites, in other embodiments.

Additionally, each satellite of the fleet transmits downlink signals during a segment of its orbit (e.g., a segment that is at or near apogee), and toward a population of UE systems within line of sight of the satellite when it is at or near apogee. A satellite may transmit downlink signals at a relatively low transmission power (e.g., less than 100 W per channel), when compared with geostationary satellite transmissions.

As mentioned above, each satellite within a fleet follows an HEO path, in an embodiment. The satellites within the fleet have orbit parameters that cause the satellites to present themselves over substantially the same geographical areas during their orbit rotations. In other words, the satellites may follow orbit paths associated with a substantially fixed ground track.

This ground track is referred to herein as a "common" ground track, because all satellites within the fleet are phased in their orbits so that they follow the same ground track, in an embodiment.

As discussed previously, each satellite travels in a Molniya orbit, in an embodiment. As used herein, the term "Molniya orbit" means an orbit having an inclination of about 63.4 degrees, for which there is substantially no precession of the line of apsides due to the Earth's equatorial bulge. A Molniya orbital period of about twelve hours is synchronized with that of the Earth's rotation, with two revolutions per day. Thus, two apogees with longitudes 180 degrees apart remain substantially fixed relative to the Earth. In various embodiments, the orbit has an eccentricity within a range of about 0.71 to 0.75 (e.g., about 0.729 in a particular embodiment). In addition, in an embodiment, the orbit has an apogee altitude in a range of about 39,000 to 40,000 kilometers (km) (e.g., about 39,547 km in a particular embodiment), and a perigee altitude in a range of about 260 to 1325 km (e.g., about 820 km in a particular embodiment). The term "Molniya" orbit, as used herein, is not meant to limit the scope of the inventive subject matter to any other external definition of the term.

At an orbit inclination angle of 63.4, the absidial line (i.e., the line containing the semi-major axis of the ellipse) remains oriented in about the same direction in inertial space. Accordingly, this angle of inclination substantially prevents "absidial drift," or precession of the line of apsides around the orbit. In various embodiments, the orbits may have apogees in either the Northern or Southern hemispheres.

In an embodiment, an orbit period is about one-half of the sidereal day, in an embodiment, or about 12 hours. Accordingly, the orbit is subsynchronous with the rotation of the Earth. Due to the subsynchronicity of the orbit, a ground track may include two zeniths in the Northern hemisphere (or two nadirs in the Southern hemisphere), each of which is associated with an apogee of the satellite's orbit. The ground track zeniths are substantially stationary, meaning that each one is located at a fixed latitude and longitude. Accordingly, each day, a satellite reaches a first apogee over an intersection between a ground track first latitude and a first longitude, and a second apogee over an intersection between a ground track second latitude and a second longitude.

Figure 2:
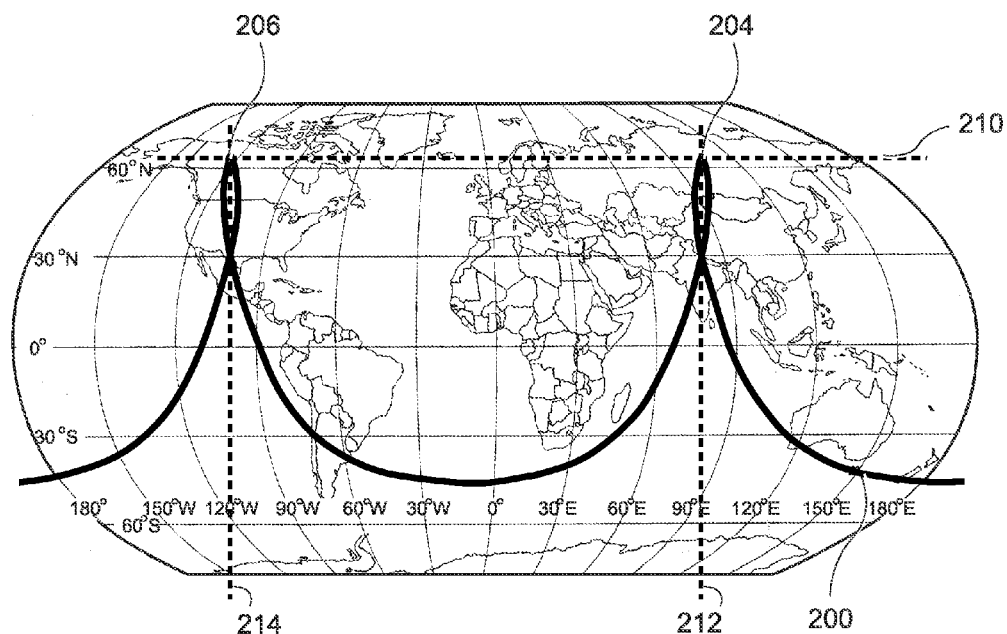
FIG. 2 illustrates a ground track, in accordance with an example embodiment.

FIG. 2 illustrates a ground track 200, in accordance with an example embodiment. Ground track 200 represents a substantially fixed path on the surface of the Earth 202, over which each satellite of a satellite fleet travels during its orbit. As discussed above, ground track 200 may include two zeniths 204, 206, each of which corresponds to an apogee of a satellite's orbit. In an embodiment, each zenith 204, 206 is located at a fixed latitude 210 and a fixed longitude 212, 214. In an embodiment, latitude 210 is about 63.4 degrees North latitude for both zeniths 204, 206. A first zenith 204 of ground track 200 is located at a first longitude 212 (e.g., a longitude bisecting the Russian Federation, India, and/or China or a longitude of about 80 degrees East being preferred in an example embodiment). A second zenith 206 of ground track 200 is located at a second longitude 214 (e.g., a longitude bisecting the United States or a longitude of about 100 degrees West being preferred, in an example embodiment).

Figure 3:
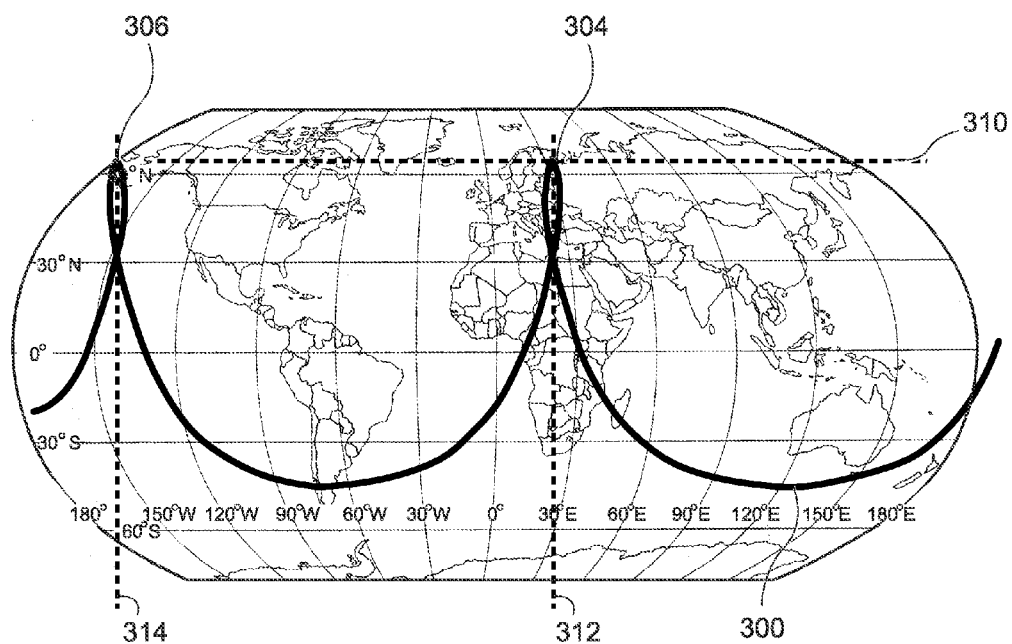
FIG. 3 illustrates a ground track, in accordance with another example embodiment.

FIG. 3 illustrates a ground track 300, in accordance with another example embodiment. Once again, ground track 300 may includes two zeniths 304, 306, each of which corresponds to an apogee of a satellite's orbit. In an embodiment, each zenith 304, 306 is located at a fixed latitude 310 and a fixed longitude 312, 314. In an embodiment, latitude 310 is about 63.4 degrees North latitude for both zeniths 304, 306. A first zenith 304 of ground track 300 is located at a first longitude 312, (e.g., a longitude bisecting Europe or a longitude of about 10 degrees east being preferred in an example embodiment). A second longitude 314 may correspond to a second zenith 306 that is about 180 degrees separated from the first longitude 312, in an embodiment. Although the example embodiments of FIGS. 2 and 3 describe preferred longitudes, any of a wide range of longitudes may be chosen in which the communications service is supported.

Figure 4:
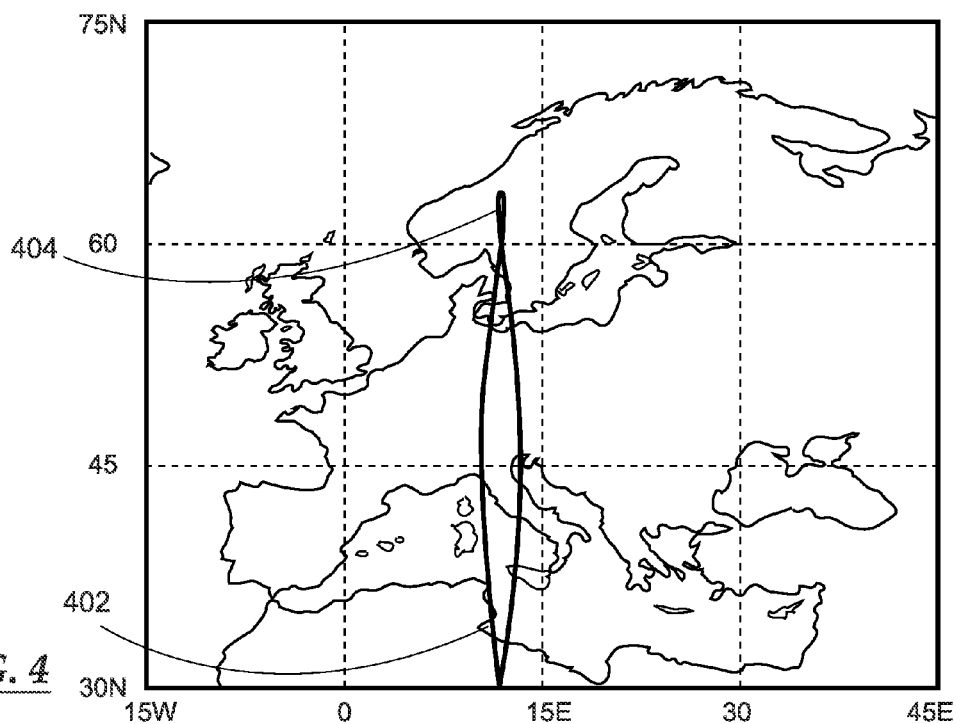
FIG. 4 illustrates a portion of the ground track of FIG. 3 within 35 degrees of latitude of the apogee.
Figure 5:
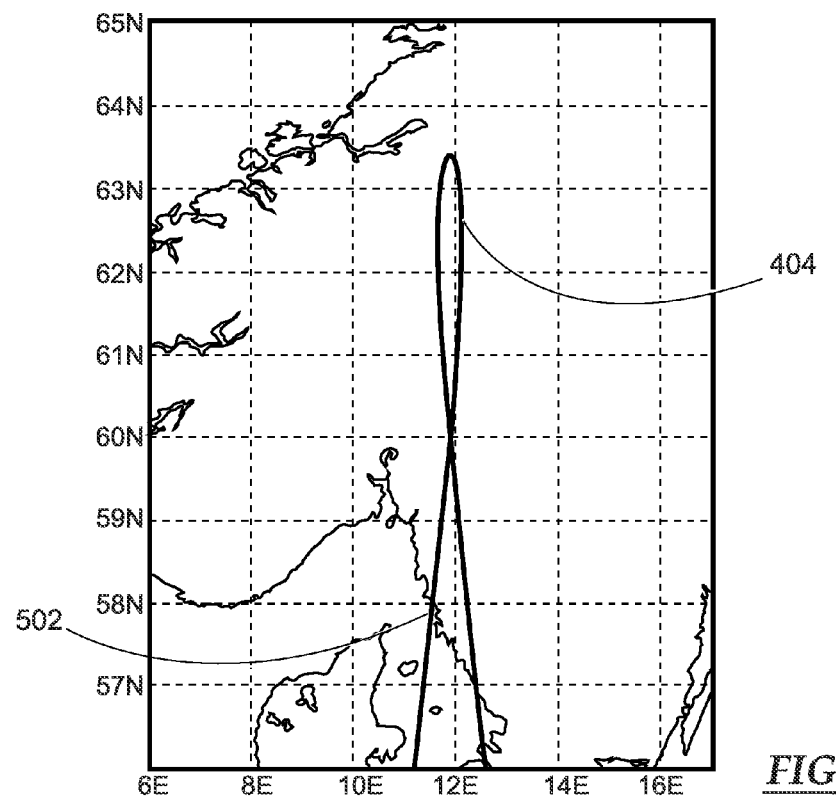
FIG. 5 illustrates a portion of the ground track of FIG. 3 within 8 degrees of latitude of the apogee.

FIG. 4 illustrates a portion 402 of the ground track of FIG. 3 within 35 degrees of latitude of the apogee, and FIG. 5 illustrates a portion 502 of the ground track of FIG. 3 within 8 degrees of latitude of the apogee, in accordance with an embodiment. As FIGS. 4 and 5 illustrate, the ground track may include a relatively small loop 404 when a satellite is near its apogee. This loop 404 (and other ground track shapes, as will be described later) is referred to herein as "apogee portion of the ground track". In an embodiment, an apogee portion of the ground track (e.g., loop 404) occurs when the satellite is within about 3.4 degrees latitude of the apogee, or between about 60 and 63.4 degrees latitude.

A satellite spends a significant portion of its orbit period while traversing the apogee portion of the ground track (e.g., while traversing loop 404). For example, in an embodiment, a satellite may spend about a third of its 12 hour orbit period (or about 4 hours) while traversing the apogee portion of the ground track. Accordingly, a satellite may appear, from the ground, to linger or dwell at or near its apogee, and the satellite may appear to travel rapidly through a segment of its orbit near its perigee.

Figure 6:
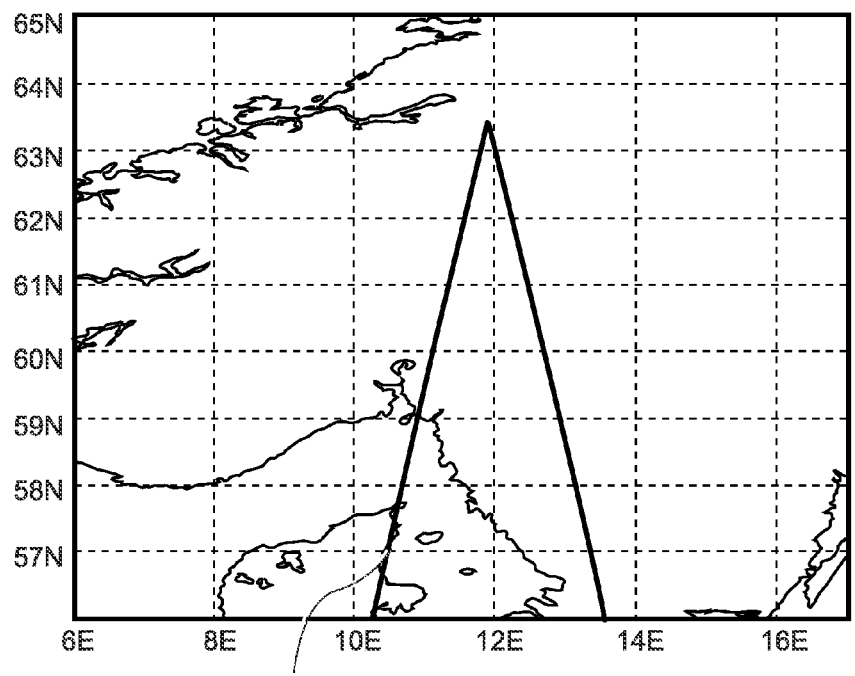
FIG. 6 illustrates a portion of a ground track within 8 degrees of latitude of the apogee, in accordance with another example embodiment.

The particular shape of a ground track depends on the orbital parameters chosen for the satellites. In the embodiments illustrated in FIGS. 4 and 5, the ground track includes loop 404. In other embodiments, the ground track may include a smaller or larger loop at the apogee portion of the ground track, or may not include such a loop at all. For example, FIG. 6 illustrates a portion 602 of a ground track within 8 degrees of latitude of the apogee, in accordance with another example embodiment. As FIG. 6 illustrates, the ground track may not necessarily include a loop in proximity to the apogee portion of the ground track, but instead may follow a different type of path near apogee.

Figure 7:
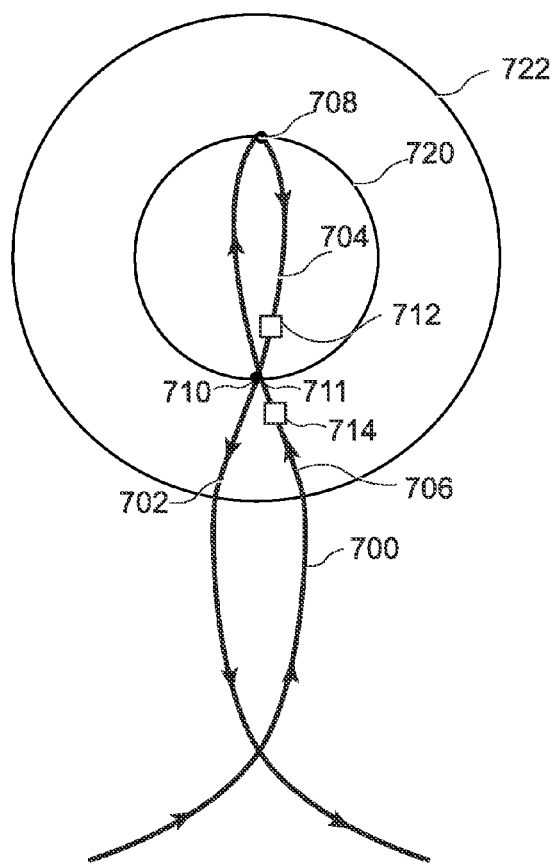
FIG. 7 illustrates an apogee portion of a ground track with user antenna beam limits superimposed, in accordance with an example embodiment.

FIG. 7 illustrates an apogee portion of a ground track 700 with user antenna beam limits superimposed, in accordance with an example embodiment. Ground track 700 includes an entry portion 702, a ground track loop 704, and an exit portion 706. Ground track loop 704 may correspond to the ground track between about 60 and 63.4 degrees latitude, in an example embodiment. A zenith 708 of ground track 700 corresponds to a point at which a satellite reaches its apogee. Entry portion 702, ground track loop 704, and exit portion 706 intersect at entry point 710 and exit point 711, in an embodiment. In the illustrated embodiment, entry point 710 and exit point 711 are co-located, and the entry and exit points 710 and 711 may occur at about 60 degrees latitude. In other embodiments, either or both an entry point 710 and an exit point 711 may be located in at other longitudes. In an embodiment, each satellite within a fleet sequentially travels through segments of its orbit associated with entry portion 702, ground track loop 704 (in clockwise direction), and exit portion 706. For description purposes only, FIG. 7 illustrates two satellites 712, 714 at points along ground track 700.

Circle 720 represents a cone originating at the center of the Earth and extending into space. Circle 720 may correspond to a cone having a diameter of about 3.4 degrees, which is centered at about 1.7 degrees south of zenith 708, for example, although the cone could be defined by differently valued parameters, in other embodiments. In an embodiment, at any given time, at least one satellite of a fleet is located within the cone corresponding to circle 720.

In an embodiment, circle 722 corresponds to the half power beamwidth for a UE antenna (e.g., UE antenna 106, FIG. 1). In an example embodiment, a UE antenna may have a diameter of about 65 cm. At a transmission frequency of about 4 GHz, the half power beamwidth is about 8 degrees, and the off beam center loss for a satellite at the edge of the cone corresponding to circle 720 is about 0.6 decibels (db), in an embodiment.

In an embodiment, a satellite fleet includes six satellites in orbits that are substantially equally spaced around the Earth (e.g., the orbits are about 60 degrees apart), and the satellites are phased in their orbits so that the satellites track along a common ground track (e.g., ground track 700). When the orbits of such a fleet have orbital parameters as previously discussed, a first satellite 712 may be exiting a segment of its orbit that terminates at exit point 711 at approximately the same time that a second satellite 714 is entering a segment of its orbit that begins at entry point 710. Accordingly, at any given time, at least one satellite of a fleet may be present within a segment of its orbit between entry point 710 and exit point 711 (e.g., an orbit segment associated with ground track loop 704), in an embodiment. In a further embodiment, a satellite (e.g., satellite 712) may transmit downlink signals only during a segment of its orbit when it is between entry point 710 and exit point 711.

In an embodiment, satellite 712 transmits downlink signals only during a particular segment of its orbit. For example, satellite 714 may have downlink signal transmissions turned off while in an orbit segment corresponding to entry portion 704. As satellite 714 approaches entry point 710, satellite 714 may initiate downlink signal transmissions. In an embodiment, satellite 712 may cease to transmit downlink signals at approximately a concurrent time. Satellite 714 may continue downlink signal transmissions as it travels through an orbit segment between entry point 710 and exit point 711. As satellite 714 approaches exit point 711, satellite 714 may discontinue downlink signal transmissions. Satellite 714 may than travel through its perigee, and toward another apogee.

A segment of a satellite's orbit within which it transmits downlink signals (e.g., when the satellite's communications equipment is transmitting to the ground) is referred to herein as an "active orbit segment," and a segment of a satellite's orbit within which it does not transmit downlink signals is referred to herein as an "inactive orbit segment." An active orbit segment may be defined as an orbit segment that is centered about an apogee has a duration of a sidereal day divided by a total number of satellites in the satellite fleet. A duration of time when a satellite is within an active orbit segment depends on the number of satellites in the fleet. For example, when a fleet includes six satellites, a duration of time when a satellite is within an active orbit segment is approximately four hours (i.e., sidereal day divided by six). Accordingly, a satellite may be located within an active orbit segment about two hours before reaching apogee through about two hours after reaching apogee. When a fleet includes eight satellites, a duration of time when a satellite is within an active orbit segment is approximately three hours, and so on. Using the above terminology, each satellite is adapted to transmit downlink signals during an active orbit segment, and each satellite is further adapted to avoid transmitting downlink signals during an inactive orbit segment.

Referring again to FIG. 3, ground track 300 is shown to include two zeniths 304, 306, spaced about 180 degrees of longitude apart. Active orbit segments may include orbit segments proximate to either or both zeniths 304, 306 of ground track 300, and accordingly an active orbit segment may correspond to every apogee or every other apogee. In an embodiment, orbit segments proximate to both zeniths 304, 306 may be considered active orbit segments, and downlink signal transmissions may occur during both of those segments. In an alternate embodiment, an active orbit segment may correspond to every other apogee. Accordingly an orbit segment proximate to one zenith (e.g., zenith 304) may be considered an active orbit segment, and downlink signal transmissions may occur during that segment. In such an embodiment, an orbit segment proximate to the other zenith (e.g., zenith 306) may be considered an inactive orbit segment, and no downlink signal transmissions may occur during that segment.

As described above, satellites within a system may be controlled to selectively transmit downlink signals, in an embodiment. In an embodiment, a satellite may avoid transmitting downlink signals as it passes through the equatorial belt and through its perigee. By avoiding downlink signal transmissions while passing through the equatorial belt, in accordance with various embodiments, interference may be avoided with geostationary satellites and/or other satellites having orbit paths with relatively small angles of inclination.

A coverage area may correspond to a geographic area on the surface of the Earth toward which a satellite may transmit downlink signals during their active orbit segments, and within which a UE antenna (e.g., antenna 106, FIG. 1) may adequately receive the downlink signals. In various embodiments, a zenith (e.g., zenith 304, FIG. 3) of the ground track may be located at a longitude proximate to a mid-longitude of a coverage area.

Figure 8:
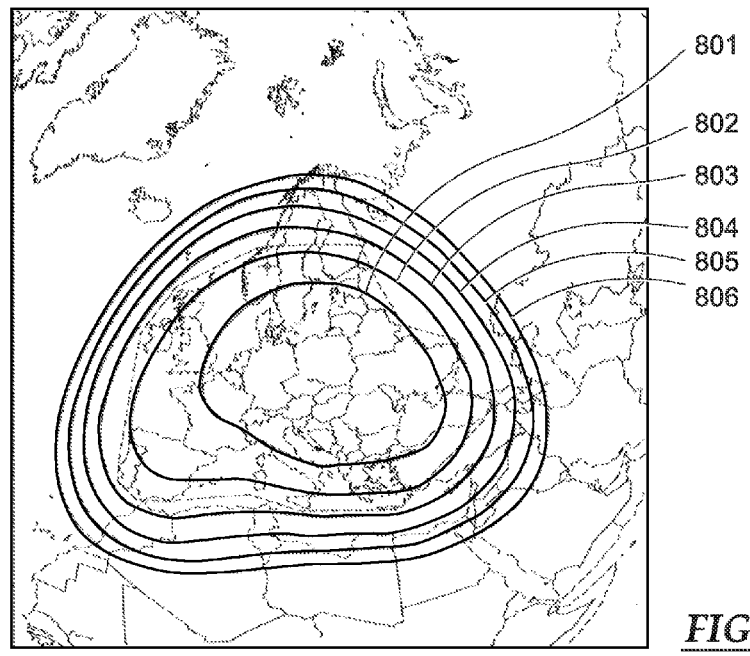
FIG. 8 illustrates a coverage area, in accordance with an example embodiment.

FIG. 8 illustrates a coverage area, in accordance with an example embodiment. A coverage area may be represented by one or more contours. For example, FIG. 8 illustrates six contours 801, 802, 803, 804, 805, 806. Each contour may correspond to a predefined signal power and/or signal-to-noise ratio, where a signal-to-noise ratio at an inner contour (e.g., contour 801) may be higher than a signal-to-noise ratio at an outer contour (e.g., contour 806). The shape of a contour may be affected by various antenna characteristics. The contours 801-806 of FIG. 8 illustrate the gain of the antenna for transmission, as viewed by the spacecraft near apogee.

Figure 9:
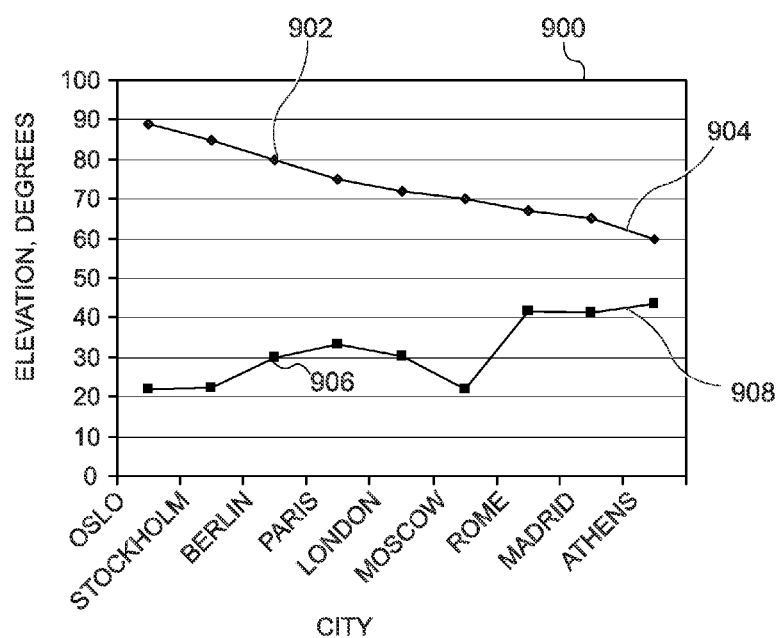
FIG. 9 illustrates elevation angles that may be available within a coverage area, in accordance with an example embodiment.

FIG. 9 is a graph 900 comparing elevation angles, at various locations, for a system in accordance with an example embodiment, and a system that employs geostationary (GEO) satellites. Points 902 on line 904 indicate approximate elevation angles, at various locations, between user equipment and satellites of various embodiments of the inventive subject matter. These elevation angles may fall within a range of about 60 to 90 degrees, for example. Points 906 on line 908 indicate approximate elevation angles between user equipment and GEO satellites. These elevation angles typically may fall within a range of about 20 to 45 degrees. Because the elevation angles for user equipment are significantly higher along line 904, significantly improved service may be achieved, at the indicated locations (and elsewhere above about 60 degrees North latitude or below about 60 degrees South latitude), using embodiments of the inventive subject matter.

Within a coverage area (e.g., an area proximate to zenith 304, FIG. 3), a DBS system may provide a downlink capacity within a range of about 800-900 Megabits per second (Mbps), with a capacity of about 864 Mbps in a particular embodiment. This corresponds to 36 Mbps for each of 24 RF channels, in an embodiment. Each 36 Mbps channel may contain a plurality of ordinary and/or high-definition digitally compressed television signals (e.g., 18 ordinary and/or 7 high-definition digitally compressed television signals). When the system services two coverage areas (e.g., areas proximate to two apogees 204, 206, FIG. 2), the system may provide a total downlink capacity that is about twice the capacity of a single coverage area, or within a range of about 1.6 to 1.8 Gigabits per second (Gbps), with a total capacity of about 1.728 Gbps in a particular embodiment. A system may provide downlink capacities larger or smaller than the above given ranges, in other embodiments.

Figure 10:
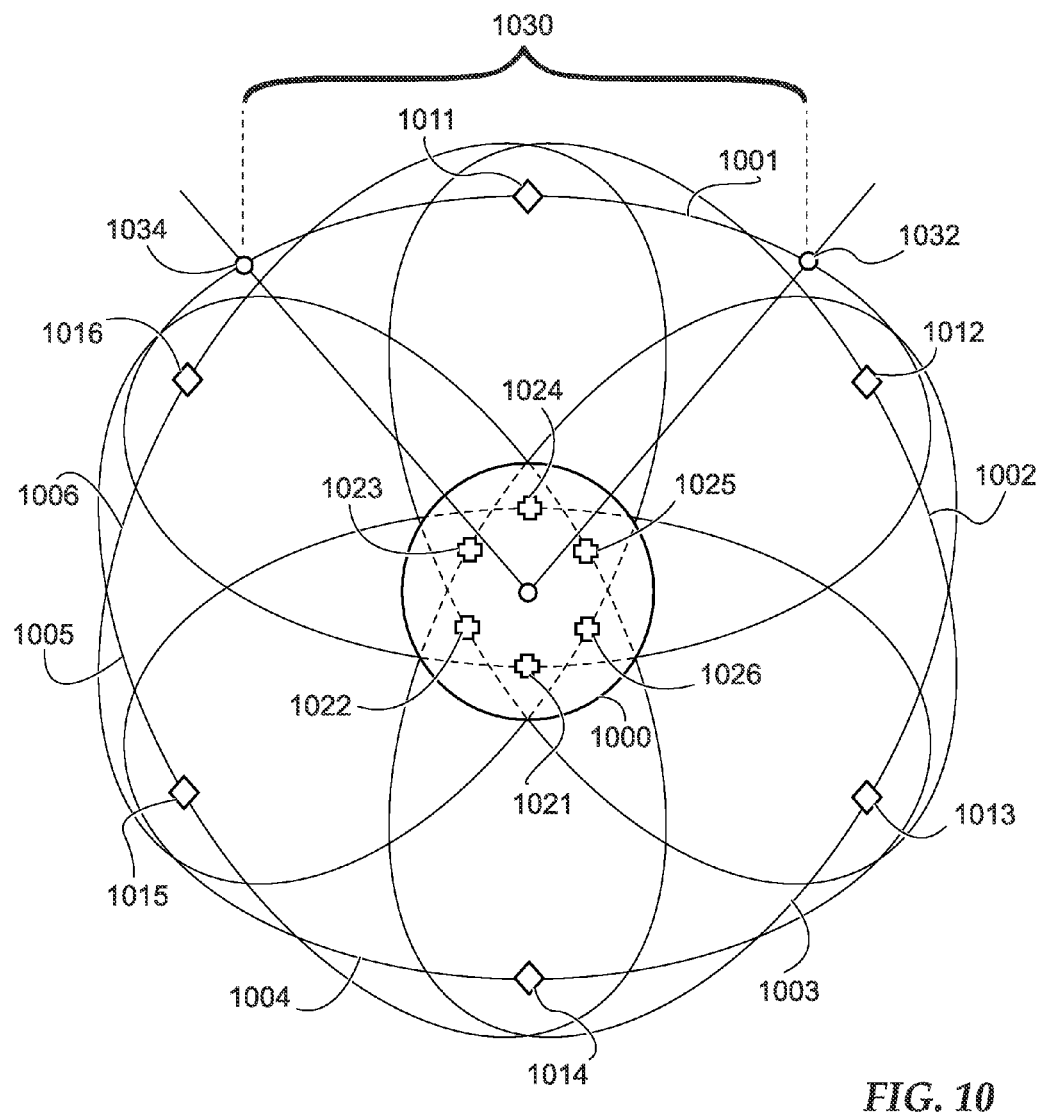
FIG. 10 illustrates a configuration of orbits for multiple satellites from the perspective of space, in accordance with an example embodiment.

FIG. 10 illustrates a configuration of orbits for multiple satellites from the perspective of space, in accordance with an example embodiment. Circle 1000 represents the Earth as seen from a point far above the North Pole. The ellipses represent orbit paths 1001, 1002, 1003, 1004, 1005, 1006 for six satellites, where the orbit paths 1001-1006 have about a 60 degree nodal separation. Orbit paths 1001-1006 correspond to Molniya orbits, in an embodiment. Accordingly, a satellite of a DBS system may travel through the Van Allen belt during the course of its orbit. Apogees 1011, 1012, 1013, 1014, 1015, 1016 and perigees 1021, 1022, 1023, 1024, 1025, 1026 are indicated with diamonds and crosses, respectively, for each orbit path 1001-1006.

In an embodiment, as discussed previously, an active orbit segment may correspond to an orbit segment proximate to an apogee 1011-1016. For example, for orbit path 1001, an active orbit segment may be an orbit segment 1030 between points 1032, 1034 on either side of apogee 1011. In various embodiments, points 1032, 1034 may correspond to points within a ground track (e.g., entry and exit points 710, 711, FIG. 7), one or more latitudes, and/or some other parameter. In an embodiment, points 1032, 1034 are located substantially equal distances from apogee 1011, and a distance between points 1032, 1034 corresponds to about one third the time that a satellite takes to traverse its orbit path 1001. In an embodiment in which an orbit period is about 12 hours (e.g., one half of a sidereal day), a satellite traveling along orbit path 1001 takes about four hours to travel from point 1032 to point 1034.

In an embodiment, the orbit phasing of each satellite, with respect to other satellites within a satellite fleet, is maintained so that a first satellite enters an active orbit segment and initiates transmission of the downlink signals as a second satellite exits an active orbit segment and ceases transmission of the downlink signals, where an active orbit segment is an orbit segment that is centered about an apogee has a duration of a sidereal day divided by a total number of satellites in the plurality of satellite. In an embodiment, an active orbit segment may correspond to both ground track zeniths, or may correspond only to one. In other words, a satellite may enter an active orbit segment every time it nears an apogee or every other time, in various embodiments.

In order to provide DBS services in accordance with embodiments previously discussed, various infrastructure first is established. This infrastructure includes, for example, a satellite fleet having orbits such as those shown in FIG. 10, at least one uplink hub (e.g., hub 104, FIG. 1), and a plurality of UE systems. In addition, a system may include at least one control facility (e.g., a portion of an uplink hub or another facility) and additional infrastructure for collecting content, among other things. During system operation, the hub(s), satellite fleet, and UE systems exchange content and control information in order to provide the DBS services.

Figure 11:
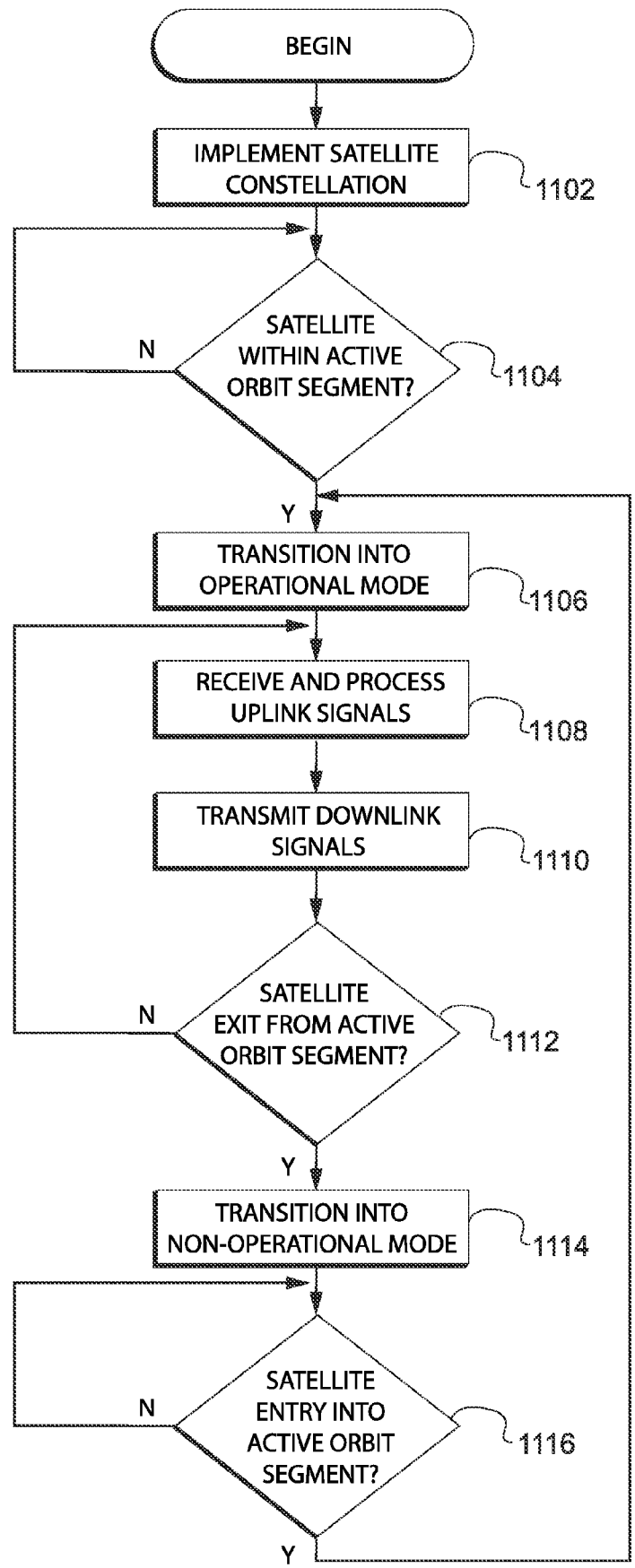
FIG. 11 illustrates a flowchart of a method for operating a direct broadcast system, in accordance with an example embodiment.

FIG. 11 illustrates a flowchart of a method for operating a direct broadcast system, in accordance with an example embodiment. The method begins, in block 1102, by implementing a satellite fleet. Implementing a satellite fleet includes building a number of satellites that are adapted to receive uplink signals and transmit downlink signals (e.g., television signals), and to maintain their orbits appropriately. In addition, implementing a satellite fleet includes launching the satellites, and deploying the satellites into orbits having specific orbital parameters, and at the proper nodal separation and phasing.

Pre-deployed satellites may be launched one at a time (e.g., one satellite per launch vehicle) or in groups (e.g., multiple satellites per launch vehicle). In an embodiment, multiple satellites may be launched in a single launch vehicle.

Figure 12:
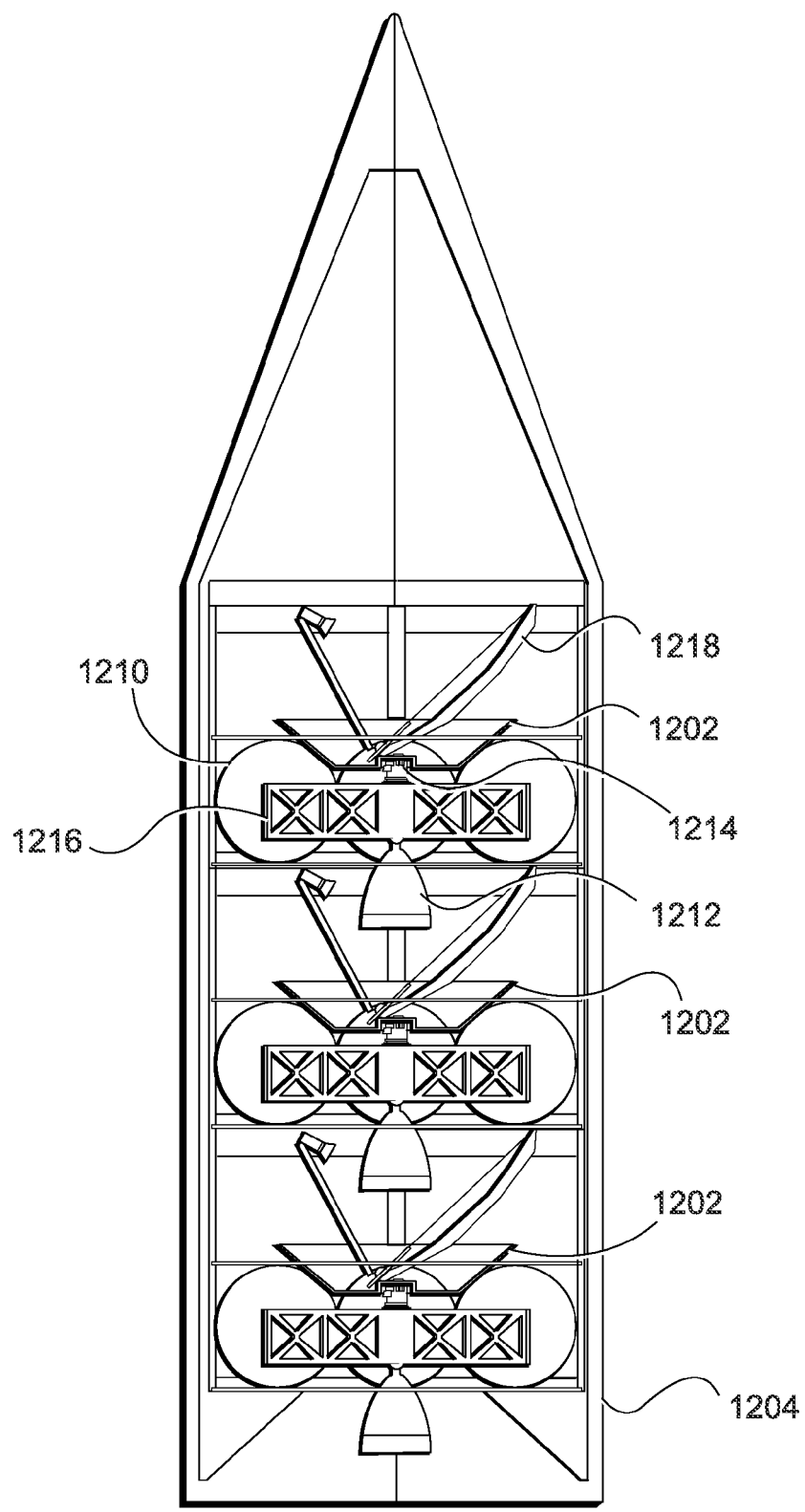
FIG. 12 illustrates a cross-sectional, side view of a configuration of multiple satellites stacked within a launch vehicle, in accordance with an example embodiment.

FIG. 12 illustrates a cross-sectional, side view of a configuration of multiple satellites 1202 stacked within a payload fairing 1204 of a launch vehicle, in accordance with an example embodiment. A launch vehicle may include two stages, three stages, or some other number of stages, in various embodiments. For example but not by way of limitation, a launch vehicle may be a two-stage Land Launch Zenit-2SLB launch vehicle, although other types of launch vehicles may be used in other embodiments.

A launch vehicle and its associated payload fairing 1204 should have a sufficient size and payload capacity to carry multiple satellites into a desired orbit. For example, a two stage launch vehicle may have a payload capacity in a range of about 12,000 kilograms (kg) for carrying the satellites into a low altitude parking orbit, from which the satellites propel themselves into a Molniya orbit. Alternately, a three stage launch vehicle may have a payload capacity in the range of 6000 kg launched into the Molniya orbit directly. A launch vehicle may have larger or smaller payload capacities, in other embodiments.

In the illustrated embodiment, three satellites 1202 are stacked on a payload adaptor within payload fairing 1204. In other embodiments, more or fewer satellites may be stacked or otherwise arranged within a payload fairing. In an embodiment, payload fairing 1204 has a diameter that is adapted to securely contain satellites 1202. For example, payload fairing 1204 may have a diameter in a range of 3 m to 5 m, with a diameter of 4.1 m in a particular embodiment.

Each satellite 1202 may include, for example, fuel tanks 1210, an orbit change rocket 1212, a bearing and power transfer assembly 1214, a solar cell panel and structure 1216, a communication antenna 1218, and communications and control systems (not illustrated). Functionality of communications and control systems will be described in more detail later in conjunction with FIG. 14.

Upon launch, satellites 1202 may be released into an initial orbit, and then transitioned to an operational orbit with the aid of rocket 1212. A desired nodal separation (e.g., a 60 degree nodal separation) may then be achieved. As discussed previously, an operational orbit is a highly elliptical orbit (e.g., a Molniya orbit) with an orbital period of about 12 hours and an angle of inclination of about 63.4 degrees, in an embodiment. Satellites 1202 may be boosted into their operational orbits, for example, by imparting an adequate velocity increment. The velocity increment may be imparted, for example, by a bi-propellant liquid rocket of high specific impulse. In another embodiment, a satellite 1202 may be inserted directly into its operational orbit, thus conserving on-board fuel that otherwise would have been used for orbit acquisition. In an embodiment, once a satellite is inserted into its operational orbit, it maintains itself in that orbit.

Referring again to FIG. 11, once the satellite fleet is implemented, the system may begin operations. In an embodiment, each satellite may be in an inactive mode prior to system operations startup and whenever a satellite is located within an inactive orbit segment. In an inactive mode, a satellite may conserve power by maintaining communications and control systems in a low-power state, and the satellite may refrain from transmitting downlink signals or receiving uplink signals, with the possible exception of health, status, and control-types of signals. Whenever a satellite is located within an active orbit segment (e.g., segment 1030, FIG. 10), a satellite may be in an active mode. In an active mode, a satellite may maintain communications and control systems in an operational-power state, and the satellite may receive uplink signals and transmit downlink signals (e.g., television signals). At system operations startup time, assuming all satellites of a fleet are within their operational orbits, at least one satellite will be located within an active orbit segment, in an embodiment, although initially it may be in an inactive mode.

Accordingly, in block 1104, an initial determination is made whether a satellite is located within an active orbit segment. This initial determination may be based on satellite position information, and may be made by a satellite, a hub, or within a control center, in various embodiments. Satellite position information may be calculated from global positioning system (GPS) data and/or from other satellite telemetry. When a satellite is not located within an active orbit segment, the method may iterate as shown.

When a satellite is located within an active orbit segment, the satellite may transition into an active mode, in block 1106, in an embodiment. Transition into an active mode may include switching the satellite transmitter and receiver on. The satellite may then receive uplink signals, in block 1108. In an embodiment, uplink signals include uplink television signals, which may include multiple channels of television content (e.g., audio and video) that are multiplexed or otherwise simultaneously transmitted. Uplink signals may include other types of information (e.g., internet or other computer network information), in addition or alternatively.

In block 1110, the satellite may simultaneously transmit downlink signals toward the surface of the Earth, in an embodiment. Transmission of downlink signals may include broadcasting downlink television signals toward a population of UE systems within a coverage area, in an embodiment. Blocks 1108 and 1110 may occur simultaneously, in an embodiment, and for a duration of the time that a satellite is located within an active orbit segment.

In an embodiment, a downlink signal may include multiple channels of television content, which may be multiplexed, and/or which may be spaced apart over the available spectrum. For example, a downlink signal may include 24 channels, which may be spaced apart by about 40 MHz when transmitted within the C-band. The active bandwidth per channel may be less than the spacing to mitigate potential effects of interference. For example, the active bandwidth per channel may be about 36 MHz. In an embodiment, a modulation system may provide one bit per second per Hertz, so that each channel may carry 36 Mbps. In alternate embodiments, a downlink signal may include more or fewer channels, have larger or smaller channel spacings and/or active bandwidths per channel, and/or compression algorithms may enable multiple channels to be carried in each band (e.g., 18 television channels per band). In still other embodiments, one or more channels may be used to carry internet or other types of information.

In block 1112, a determination may be made whether the satellite is exiting or has exited from an active orbit segment, in an embodiment. This determination may be based on satellite position information, and may be made by a satellite, a hub, or within a control center, in various embodiments. When a satellite is not exiting or has not exited an active orbit segment, the method may iterate as shown.

When a satellite is exiting or has exited an active orbit segment, the satellite may transition into a non-active mode, in block 1114, in an embodiment. Transition into a non-active mode may include switching the transmitter and receiver off. In an embodiment, a satellite may remain in a non-active mode for a duration of time that the satellite is located within an inactive orbit segment.

In block 1116, a determination is made whether a satellite is entering or has entered an active orbit segment. Once again, this initial determination may be based on satellite position information, and may be made by a satellite, a hub, or within a control center, in various embodiments. When the satellite is not entering or has not entered an active orbit segment, the method may iterate as shown. When the satellite is entering or has entered an active orbit segment, the method may proceed to block 1106, in which the satellite may transition into an active mode. The method may then iterate as shown.

Various elements of a DBS system (e.g., system 100, FIG. 1) will now be described in more detail. In particular, simplified block diagrams of a UE system and a satellite will be described below.

Figure 13:
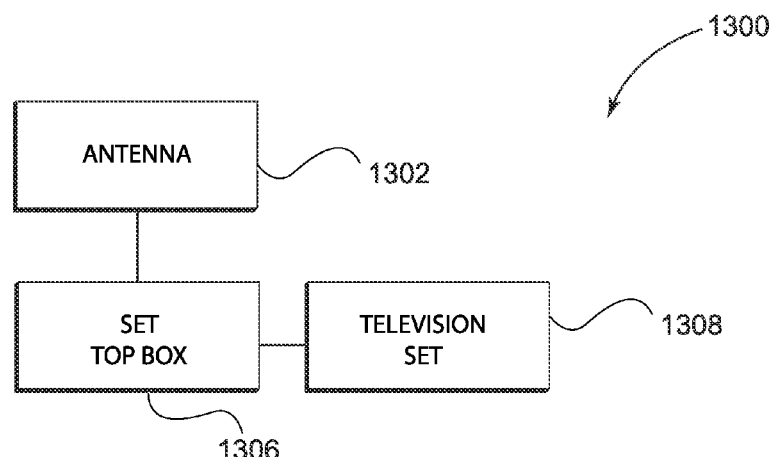
FIG. 13 illustrates a simplified block diagram of a user equipment system, in accordance with an example embodiment.

FIG. 13 illustrates a simplified block diagram of a UE system 1300, in accordance with an example embodiment. UE system 1300 may be used, for example, to receive and present downlink signals from a satellite. In an embodiment, the downlink signals may include broadcast television signals. Accordingly, UE system 1300 is described in the context of a DBS television system. In other embodiments, UE system 1300 may be modified to receive and present other types of downlink information, and may be used in conjunction with one or more computers, appliances, or other types of devices.

UE system 1300 includes an antenna 1302, a set top box 1306, and a television set 1308, in an embodiment. Antenna 1302 is adapted to receive downlink signals (e.g., broadcast, analog television signals) from the air interface, which were transmitted by a satellite (e.g., satellite 102, FIG. 1). Antenna 1302 may include receiver electronics, which may include, for example, one or more switches, low-noise amplifiers, downconverters, and other components. In an embodiment, antenna 1302 is a highly-directional antenna, where a highly-directional antenna is defined as an antenna with a directivity of at least 100 times that of an omnidirectional antenna. In a further embodiment, antenna 1302 is adapted to receive signals transmitted at frequencies within a range of about 3.7 to 4.2 GHz, or within the C-band. In other embodiments, antenna 1302 may be adapted to receive signals transmitted within other frequency ranges. Because of the range of frequencies in which satellites transmit downlink signals, antenna 1302 may have a diameter of about 65 cm, in an embodiment. In other embodiments, antenna 1302 may have a larger or smaller diameter or may be non-circular.

Antenna 1302 is a non-tracking antenna, in an embodiment, meaning that antenna 1302 does not include a tracking mechanism adapted to dynamically point toward and track a satellite from which antenna 1302 is receiving transmissions. Antenna 1302 may be a non-tracking antenna because of the configuration of the satellites with respect to the UE system, when the UE system is located within a coverage area (e.g., coverage area 506, FIG. 5). In an embodiment, antenna 1302 is adapted to receive downlink signals transmitted by a satellite of a satellite fleet while the satellite is within an active orbit segment.

Antenna 1302 receives and amplifies the multiple downlink signals in a low noise receiver and block downconverts them to an intermediate frequency. Antenna 1302 then transmits the signals to set top box 1306.

Set top box 1306 may be located in proximity to television set 1308, in an embodiment, and is adapted to provide an interface between antenna 1302 and television set 1308 to enable television set 1308 to display audio and video content within a selected channel. Set top box 1306 is adapted to demultiplex, demodulate, decode, decompress, and format the signals from antenna 1302 for acceptance by a television receiver associated with television set 1308. Set top box is further adapted to perform at least one process, including receiving information from a user regarding channel selection (e.g., via a set top box user interface or via remote control signals), and causing television set 1308 to display audio and video content within the selected channel. Television set 1308 may display the selected channel content via audio and video interfaces associated with television set 1308.

Figure 14:
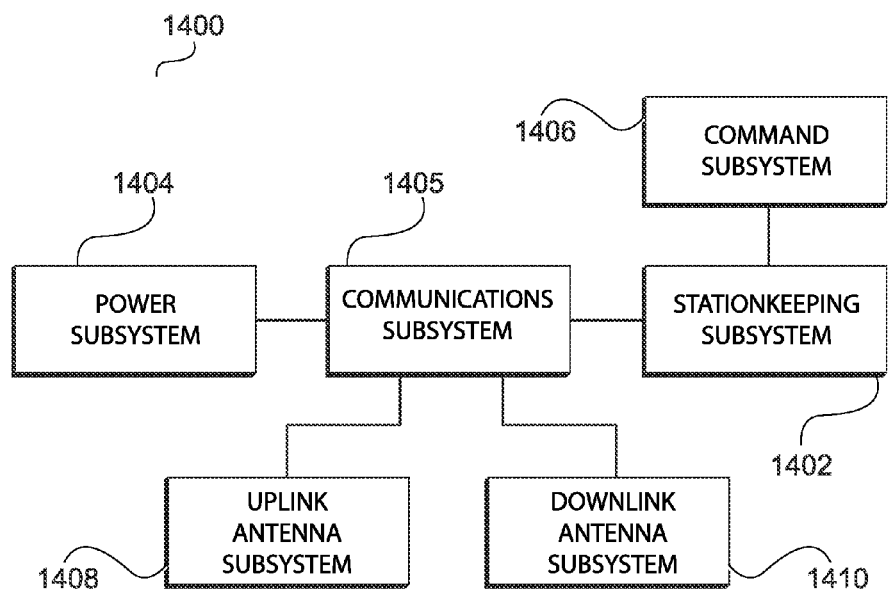
FIG. 14 illustrates a simplified block diagram of a satellite, in accordance with an example embodiment.

FIG. 14 illustrates a simplified block diagram of a satellite 1400, in accordance with an example embodiment. Satellite 1400 may include a stationkeeping subsystem 1402, a power subsystem 1404, at least one communications subsystem 1405, at least one command subsystem 1406, an uplink antenna subsystem 1408, and a downlink antenna subsystem 1410, in an embodiment. Stationkeeping subsystem 1402 may be responsible for maintaining satellite 1400 the satellite's orbit. Accordingly, stationkeeping subsystem 1402 may calculate and/or receive attitude and/or orbit adjustment information, and may operate one or more propulsion elements in order to adjust the satellite's attitude and/or orbit. In a particular embodiment, stationkeeping subsystem 1402 is adapted to maintain satellite 1400 in a highly elliptical orbit (e.g., a Molniya orbit) with an orbital period of about 12 hours and an angle of inclination of about 63.4 degrees (North or South latitude), while countering the perturbing gravitational influences of the sun and the moon. Maintaining the orbit may also include maintaining equal nodal separations between the satellites and other satellites within a satellite fleet (e.g., nodal separation of about 60 degrees for a fleet of six satellites). In particular, stationkeeping subsystem 1402 may be adapted to maintain an orbit phasing of the satellite, with respect to other satellites within the satellite fleet, so that the satellite enters an active orbit segment and initiates transmission of downlink signals as a second satellite exits an active orbit segment and ceases transmission of the downlink signals. In an embodiment, orbital phasing may be adjusted to permit uninterrupted transmissions while the satellite is within an active orbit segment. A fuel source may be associated with stationkeeping subsystem 1402, which may be drawn upon by the various propulsion elements.

Power subsystem 1404 may provide electrical power to stationkeeping subsystem 1402, communications and control subsystem 1406, uplink antenna subsystem 1408, and downlink antenna subsystem 1410, in an embodiment. Power subsystem 1404 may include one or more solar panels and one or more batteries, for example.

As described previously, satellite 1400 may transmit signals using relatively low power (e.g., less than 100 W). Accordingly, in an embodiment, satellite 1400 may be a spinning bus satellite. A spinning bus satellite may simplify satellite control, and provide for a relatively reliable and low cost satellite, when compared to non-spinning bus satellites. However, in other embodiments, satellite 1400 may be a non-spinning bus satellite.

Uplink antenna subsystem 1408 may receive uplink signals (e.g., uplink television signals) transmitted from an uplink hub (e.g., hub 104, FIG. 1). In an embodiment, uplink signals include uplink television signals, which may include multiple channels of content (e.g., audio and video) that are multiplexed or otherwise combined together. Uplink signals may include other types of information, in addition or alternatively.

Uplink antenna subsystem 1408 may include at least one uplink receive antenna, one or more filters, and one or more amplifiers. In an embodiment, an uplink receive antenna may include a circularly-polarized or a linearly-polarized antenna. In either case, dual (orthogonal) polarizations may be used in order to make full use of the allocated spectrum.

Communications subsystem 1405 channelizes and amplifies uplink communication signals, downconverts the channels to the transmit frequency band, and amplifies the signals for transmission at the appropriate power level to the ground, in an embodiment. Final stage amplifiers may include an active traveling wave tube for each RF channel. Final stage amplifiers may include solid state power amplifiers, in other embodiments. In an embodiment, twelve channels for each polarization may be multiplexed together to provide the inputs to the downlink antenna.

Command subsystem 1406 may receive signals used for operation of the attitude and orbit control systems and for on-off switching of units of the communication system, in an embodiment. Accordingly, command subsystem 1406 may be used to activate the transmitters and/or receivers during an active orbit segment as an alternative to an autonomous on-board system for achieving this function. In an embodiment, a telemetry system may transmit appropriate information to a control station, which may be used in managing the operation of the communications and command subsystems 1405, 1406.

Downlink antenna subsystem 1410 transmits communication channels to the ground (e.g., 24 communication channels) with a directional pattern that contains all of the user equipment systems. In an embodiment, the antenna beam is pointed in the appropriate direction using a despin system and a mechanism that rotates the antenna in a plane that contains the spin axis.

Embodiments of the inventive subject matter may provide one or more technical and/or economic benefits over other systems. For example, embodiments may enable UE systems within higher Northern or Southern latitudes to receive DBS services using antennas that are practical (e.g., under 90 cm) and relatively inexpensive (e.g., non-tracking). Further, embodiments may enable UE systems within higher latitudes to receive better quality service, by reducing the effects of atmospheric attenuation and signal blocking characteristic of services provided by GSO satellite systems. Further, satellites implemented according to various embodiments may transmit downlink signals within frequency bands (e.g., the C-band) that may provide higher quality service using relatively low transmission power.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A system, comprising:
   a plurality of satellites, wherein each satellite of the plurality of satellites is adapted to receive uplink signals from at least one uplink hub, and to transmit downlink signals toward Earth in at least one directed beam, and wherein orbit paths of the plurality of satellites are Molniya orbits with an orbital period of about 12 hours and an angle of inclination of about 63.4 degrees, and wherein the plurality of satellites track along a substantially fixed path on the surface of the Earth over which each of the plurality of satellites travels during an orbit of the satellite, and wherein the plurality of satellites are phased in their orbits so that a first satellite enters an active orbit segment of the first satellite and initiates transmission of the downlink signals as a second satellite exits an active orbit segment of the second satellite and ceases transmission of the downlink signals, wherein an active orbit segment is centered about an apogee and has a duration of a sidereal day divided by a total number of satellites in the plurality of satellites;

a plurality of user equipment systems located proximate to a surface of the Earth, wherein a user equipment system includes a highly-directional, non-tracking antenna adapted to receive the downlink signals, wherein the active orbit segment of each of the satellites is configured to transmit downlink signals to the plurality of highly-directional non-tracking antennas, and wherein each of the plurality of non-tracking antennas do not include a tracking mechanism adapted to dynamically point toward and track a satellite from which each highly-directional non-tracking antenna is receiving a transmission; and wherein each of the plurality of highly-directional non-tracking antennas are configured to receive the downlink signals transmitted by a satellite of the plurality of satellites while the satellite is within an active orbit segment.

2. The system of claim 1, further comprising:
the at least one uplink hub, which is adapted to transmit the uplink signals toward each satellite of the plurality of satellites.

3. The system of claim 1, further comprising:
a plurality of user equipment systems located proximate to a surface of the Earth, wherein a user equipment system includes a highly-directional, non-tracking antenna adapted to receive the downlink signals, and wherein the highly-directional antenna is an antenna with a directivity greater than or equal to one hundred times that of an omnidirectional antenna.

4. The system of claim 1, wherein the plurality of satellites includes six satellites.

5. The system of claim 1, wherein each satellite is adapted to receive uplink television signals and to broadcast downlink television signals.

6. The system of claim 1, wherein each satellite is adapted to transmit the downlink signals during the active orbit segment and to avoid transmitting the downlink signals during an inactive orbit segment.

7. The system of claim 1, wherein each satellite transmits the downlink signals within a frequency range between 3.7 and 4.2 Gigahertz.

8. A satellite system, comprising:
at least one uplink antenna subsystem adapted to receive uplink signals from at least one uplink hub;
at least one downlink antenna subsystem adapted to transmit downlink signals toward the Earth in at least one directed beam; and
a stationkeeping subsystem adapted to maintain the satellite in a Molniya orbit with an orbital period of about 12 hours and an angle of inclination of about 63.4 degrees, and to maintain an orbit phasing of the satellite, with respect to other satellites within a satellite fleet, so that the satellite enters an active orbit segment of the satellite and initiates transmission of the downlink signals as a second satellite exits an active orbit segment of the second satellite and ceases transmission of the downlink signals, wherein an active orbit segment is centered about an apogee and has a duration of a sidereal day divided by a total number of satellites in the satellite fleet, wherein the satellite and all other satellites within the satellite fleet track along a substantially fixed path on the surface of the Earth over which each of the plurality of satellites travels during an orbit of the satellite and wherein the active orbit segment of each of the satellites is configured to transmit downlink signals to a plurality of highly-directional non-tracking antennas, and wherein each of the plurality of highly-directional non-tracking antennas do not include a tracking mechanism adapted to dynamically point toward and track a satellite from which each highly-directional non-tracking antenna is receiving a transmission;

wherein each of the plurality of highly-directional non-tracking antennas are configured to receive the downlink signals transmitted by a satellite of the plurality of satellites while the satellite is within the active orbit segment and wherein the highly-directional antenna is an antenna with a directivity greater than or equal to one hundred times that of an omnidirectional antenna.

9. The satellite system of claim 8, further comprising:
a communications subsystem adapted to transmit the downlink signals during the active orbit segment, and to avoid transmitting the downlink signals during an inactive orbit segment.

10. A user equipment system comprising:
a highly-directional, non-tracking antenna, which is adapted to receive downlink signals transmitted by a satellite of a satellite fleet while the satellite is within an active orbit segment, wherein the active orbit segment is centered about an apogee having a duration of a sidereal day divided by a total number of satellites in the satellite fleet, wherein the satellite and all other satellites within the satellite fleet track along a common ground track.

11. The user equipment system of claim 10, wherein the highly-directional, non-tracking antenna is adapted to receive the downlink signals at frequencies within a range of about 3.7 to 4.2 Gigahertz and wherein the highly-directional antenna is an antenna with a directivity greater than or equal to one hundred times that of an omnidirectional antenna.

12. The user equipment system of claim 10, further comprising:
the set top box adapted to provide an interface between the highly-directional, non-tracking antenna and a television set to enable the television set to display audio and video content within a selected channel.

13. A method performed by a satellite, the method comprising:
maintaining the satellite in a Molniya orbit with an orbital period of about 12 hours, an angle of inclination of about 63.4 degrees;
maintaining an orbit phasing of the satellite, with respect to other satellites within a satellite fleet, so that the satellite enters an active orbit segment of the satellite and initiates transmission of downlink signals as a second satellite exits an active orbit segment of the second satellite and ceases transmission of the downlink signals, wherein an active orbit segment is centered about an apogee and has a duration of a sidereal day divided by a total number of satellites in the satellite fleet, and wherein the satellite and all other satellites within the satellite fleet track along a substantially fixed path on the surface of the Earth over which each of the plurality of satellites travels during an orbit of the satellite and wherein the active orbit segment of each of the satellites is configured to transmit downlink signals to a plurality of highly-directional non-tracking antennas, and wherein each of the plurality of highly-directional non-tracking antennas do not include a tracking mechanism adapted to dynamically point toward and track a satellite from which each highly-directional non-tracking antenna is receiving a transmission;

wherein each of the plurality of highly-directional non-tracking antennas are configured to receive the downlink signals transmitted by a satellite of the plurality of satellites while the satellite is within the active orbit segment and wherein the highly-directional antenna is an antenna with a directivity greater than or equal to one hundred times that of an omnidirectional antenna;

receiving an uplink signal from at least one uplink hub; and transmitting the downlink signals toward Earth in at least one directed beam.

14. The method of claim 13, wherein maintaining the orbit further comprises:

maintaining the orbit with an apogee above 60 degrees North latitude.

15. The method of claim 13, wherein maintaining the satellite in the Molniya orbit further comprises:

maintaining an orbit with an apogee below 60 degrees South latitude.

16. The method of claim 13, wherein receiving the uplink signal comprises:

receiving an uplink signal that includes multiple channels of television content.

17. The method of claim 13, wherein transmitting the downlink signal comprises:

broadcasting a downlink signal within a frequency range between 3.7 and 4.2 Gigahertz, wherein the downlink signal includes multiple channels of television content.

18. The method of claim 13, further comprising:

determining whether the satellite is located within the active orbit segment; and when the satellite is located within the active orbit segment, transmitting the downlink signal; and when the satellite is not located within the active orbit segment, avoiding transmitting the downlink signal.

* * * * *